United States Patent [19]
Konosu et al.

[11] Patent Number: 6,135,353
[45] Date of Patent: Oct. 24, 2000

[54] 2-DIMENSIONAL CODE READER

[75] Inventors: Koji Konosu, Anjo; Akio Sugiura, Nagoya; Tadao Nojiri, Obu; Kunihiro Motizuki, Kariya, all of Japan

[73] Assignee: Denso Corporation, Kariya, Japan

[21] Appl. No.: 09/176,432

[22] Filed: Oct. 21, 1998

[30] Foreign Application Priority Data

Oct. 27, 1997 [JP] Japan .................................. 9-294449

[51] Int. Cl.[7] .................................................. G06K 7/10
[52] U.S. Cl. .................. 235/462.09; 235/462.25
[58] Field of Search ...................... 235/462.24, 462.25, 235/462.01, 472.01, 462.23, 462.22, 462.1, 462.11, 462.09

[56] References Cited

U.S. PATENT DOCUMENTS 5,484,990  1/1996  Lindacher et al. ................... 235/467

FOREIGN PATENT DOCUMENTS 8-180125  7/1996  Japan .

*Primary Examiner*—Thien M. Le
*Attorney, Agent, or Firm*—Pillsbury Madison & Sutro LLP

[57] ABSTRACT

A 2-dimensional code reader includes a camera for scanning a surface which carries a 2-dimensional code thereon, an amplifier for amplifying electric signals fed from the camera, a device for identifying a code-region out of the scanned surface and a device for detecting information contained in the 2-dimensional code. The amplifying rate or gain is controlled according to a signal level representing a brightness of the identified code-region, not depending on a brightness of a whole scanned surface. The amplifier may includes an automatic gain controller which controls the amplifying rate according to the brightness of the whole scanned surface. In this case, the amplifying rate is adjusted based on an areal ratio of the code-region to the whole scanned surface area to obtain a clear image of the code, irrespective of the brightness of the scanned surface. Some symbol marks may be included in the 2-dimensional code in order to effectively identify the code-region on the scanned surface.

16 Claims, 5 Drawing Sheets

CODE 1

CODE 2

CODE 3

CODE 4

2-DIMENSIONAL CODE READER

CROSS-REFERENCE TO RELATED APPLICATION

This application is based upon and claims benefit of priority of Japanese Patent Application No. Hei-9-294449 filed on Oct. 27, 1997, the content of which is incorporated herein by reference.

BACKGROUND OF THE INVENTION

1. Field of the Invention The present invention relates to a 2-dimensional code reader which reads information contained in a code-region where a 2-dimensional code is printed.

2. Description of Related Art

Generally, a 2-dimensional code is read in the following manner. A 2-dimensional image containing a 2-dimensional code therein is optically read by a camera such as a CCD (a charge coupled device), and a region in which the 2-dimensional code is printed is separated from the 2-dimensional image. Then, information contained in each cell of the 2-dimensional code in a form of black and white pattern is detected by a code reader, and the detected information is converted into normal characters. The 2-dimensional code contains more information than a single dimensional bar code.

A conventional device for reading the 2-dimensional code usually includes an amplifier having automatic gain control (an AGC amplifier). A gain of the amplifier is automatically controlled by a negative feedback method based on a level of an average signal level fed from a camera. In this manner, an amplifying rate of the amplifier is reduced when the image scanned by the camera is bright, and is increased when the image is dark, so that an output from the amplifier becomes constant, not influenced by brightness of the 2-dimensional image fed from the camera.

However, the 2-dimensional image fed from the camera includes not only an image of a 2-dimensional code but also other images than the code, and accordingly the amplifying rate controlled based on a brightness of the whole image may not be suitable for detecting the code itself. Some examples having various brightness of the image are shown in FIGS. 4A–4B. In an example shown in FIG. 4A, a small 2-dimensional code (code 1) is printed on a white background. In FIG. 4B, a relatively large code (code 2) is printed on a white background. In FIG. 4C, a relatively large code (code 3) is printed on a black background. In FIG. 4D, a small code is printed on a black background. If a standard amplifying rate of the amplifier is set to be suitable to read the code 2, the code 1 may not be read properly, because the amplifying rate is set at a low level because a brightness of a whole image including code 1 is very bright. On the other hand, in case of code 3, the amplifying rate is set at a high level because a brightness of a whole image including code 3 is low. Therefore, the code 3 may not be properly detected. In case of code 4, the whole image taken by the camera is further dark, and accordingly the amplifying rate is controlled at a further high level, which may cause saturation of the amplifier output.

SUMMARY OF THE INVENTION

The present invention has been made in view of the above-mentioned problem, and an object of the present invention is to provide a 2-dimensional code reader in which the amplifying rate is controlled based on a brightness of the code itself, not on a brightness of the whole image taken by the camera, so that the code is properly read under various situations.

According to the present invention, a surface which includes a 2-dimensional code is scanned by a camera such as a CCD sensor. Electric signals obtained by scanning the surface are amplified by an amplifier. A code-region in which the 2-dimensional code is printed on the scanned surface is identified by finding out a signal pattern specific of the 2-dimensional code. An amplifying rate of the amplifier is set or controlled so that an average signal level of the code-region falls within a predetermined control range. In this manner, the signal level of the code-region is always brought to a proper level, irrespective of a brightness of the scanned surface. The amplifying rate may also be controlled according to a signal level representing a relatively bright portion of the code-region.

The amplifier may be the one including an automatic gain controller which controls the amplifying rate automatically by comparing a signal level from the scanned surface and a predetermined standard level. In this case, the automatically set amplifying rate is adjusted by changing the standard level or a correction voltage to be fed-back to the amplifier. The standard level or the correction voltage can be determined according to a areal ratio of the code-region to the scanned surface.

The 2-dimensional code may includes symbol marks for locating the code-region on the scanned surface. At least two symbol marks, preferably three symbol marks, are positioned at corners of the 2-dimensional code. Each symbol mark has a symmetrical pattern which generates a specific electric signal pattern when it is scanned in any direction passing through the center thereof. By using a 2-dimensional code having such symbol marks, the code-region is effectively identified.

Illumination on a surface to be scanned may be controlled in synchronism with setting up or changing the amplifying rate. Under particular situations where changing the amplifying rate alone is not sufficient for correctly reading the 2-dimensional code, choosing a proper illumination, both in its intensity and illuminating period, will enhance the ability of the reader.

Other objects and features of the present invention will become more readily apparent from a better understanding of the preferred embodiments described below with reference to the following drawings.

DETAILED DESCRIPTION OF THE PREFERRED EMBODIMENTS

Figure 1:
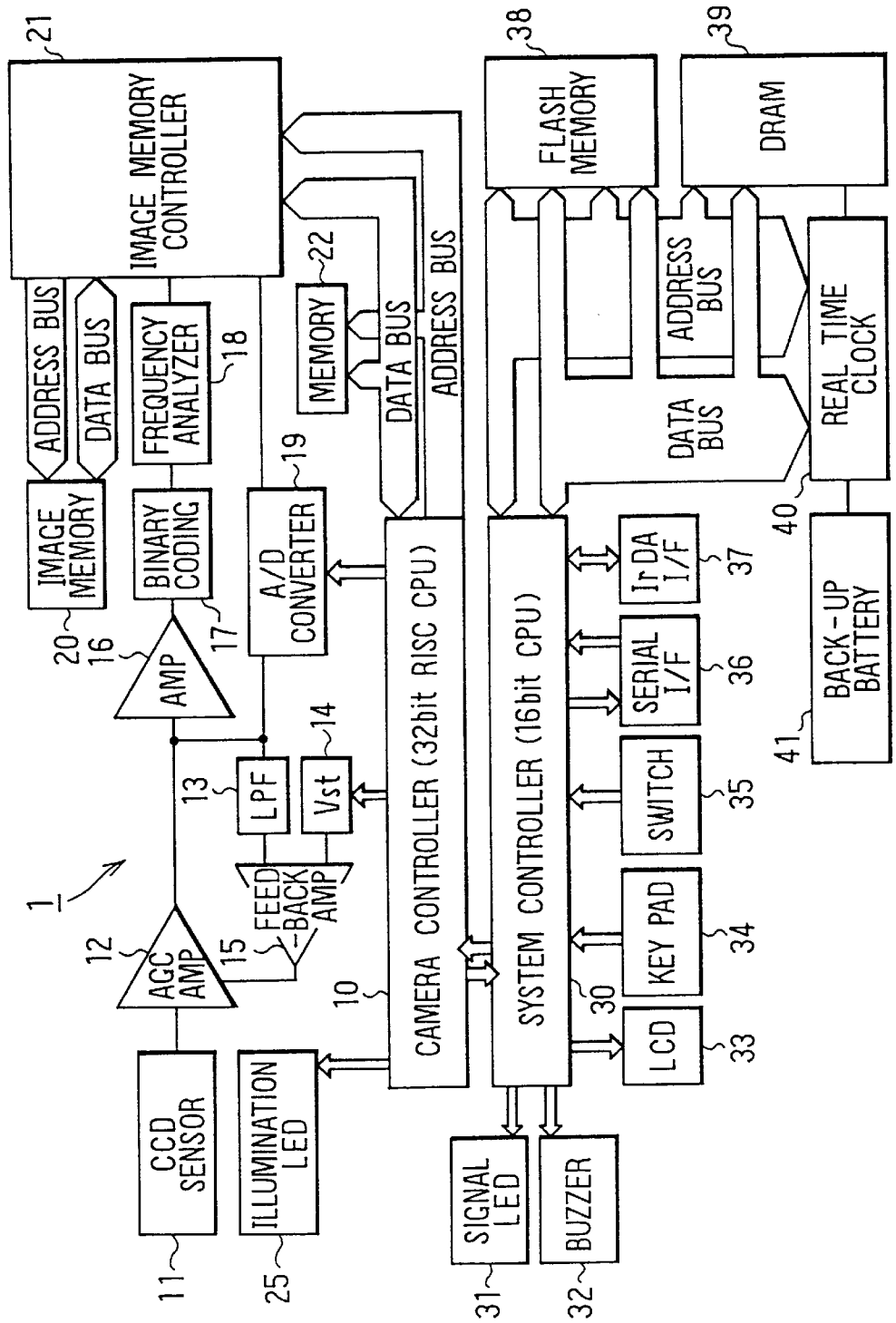
FIG. 1 is a block diagram showing a 2-dimensional code reader as a first embodiment of the present invention.

Referring to FIGS. 1–3B, a first embodiment according to the present invention will be described. As shown in FIG. 1, a 2-dimensional code reader 1 includes two controllers, i.e., a camera controller 10 and a system controller 30. Components or circuits relating to the camera controller 10 are: a CCD (charge coupled device) sensor 11, an AGC (automatic gain control) amplifier 12, an LPF (low-pass filter) 13, a standard voltage generator (Vst) 14, a negative feedback amplifier 15, an auxiliary amplifier 16, a binary coding circuit 17, a frequency analyzer 18, an A-D (analog-digital) converter 19, an image memory 20, an image memory controller 21, a memory 22, and an illumination LED (light emitting diode) 33.

The CCD sensor 11 includes CCD elements for receiving light and scans a 2-dimensional image to deliver its output as a scanning signal. The scanning signal is amplified by the AGC amplifier 12 and fed to the auxiliary amplifier 16 and the A-D converter 19. The AGC amplifier 12 amplifies the scanning signal fed from the CCD sensor 11 according to a gain control voltage supplied from the negative feedback amplifier 15. An average output voltage Vav obtained by integrating the scanning signal from the AGC amplifier 12 in the low-pass filter 13 and a standard voltage Vst generated in the standard voltage generator 14 are fed to the negative feedback amplifier 15. The negative feedback amplifier 15 outputs a voltage obtained by multiplying a predetermined gain by a voltage difference ΔV between Vst and Vav as the gain control voltage. The auxiliary amplifier 16 further amplifies the scanning signal amplified by the AGC amplifier 12 and delivers its output to the binary coding circuit 17 which codifies the scanning signal into binary codes according to a predetermined threshold. The output from the binary coding circuit 17 is fed to the frequency analyzer 18 which detects a predetermined frequency component in the binary-coded scanning signal. The frequency analyzer 18 outputs its detection results to the image memory controller 21.

The A-D converter 19 converts the analog scanning signal amplified by the AGC amplifier 12 into a digital signal and feeds its output to the image memory controller 21. The image memory controller 21 is connected to the image memory 20 and the camera controller 10 through a respective address bus and a data bus. The camera controller 10 includes a 32-bit RISC CPU and controls the standard voltage generator 14, the A-D converter 19 and the illumination LED 25. The standard voltage generator 14 is controlled so that it changes a level of the standard voltage Vst. The illumination LED 25 illuminates the 2-dimensional code to be read. Also, the camera controller 10 communicates with the system controller 30 to exchange data therebetween.

Components or parts relating to the system controller 30 are: a signal LED 31, a buzzer 32, an LCD (liquid crystal display) 33, a key pad 34, a switch 35, a serial I/F circuit 36, an IrDAI/F circuit 37, a flash memory 38, a DRAM 39, a real time clock 40, and a memory back-up battery 41. The signal LED 31 is turned on when image data to be read are correctly decoded and turned off when a predetermined period lapses thereafter. The buzzer also sounds when image data are correctly decoded. The LCD 33 displays information such as a 2-dimensional code which has been read. In this particular embodiment, the LCD 33 displays a two-step image. The key pad 34 includes a ten-key and other function keys, for example, which are used to input information into the code reader. The switch 35 is used to instruct the code reader to start the operation. The IrDAI/F circuit 37 performs communication with outside devices (not shown) according to an IrDA (Infrared Data Association) protocol. The system controller 30, the flash memory 38, the DRAM 39 and the real time clock 40 are connected to one another through an address bus and a data bus. The system controller 30 which includes a 16-bit CPU receives signals from the key pad 34 and the switch 35, controls an output to the LED 31 and the buzzer 32, and controls communication through the serial I/F circuit 36 and the IrDAI/F circuit 37. The system controller 30 also instructs to display the 2-dimensional code image fed through the camera controller 10 on the LCD 33.

The 2-dimensional code reader 1 having a structure described above reads a 2-dimensional image, amplifies the image data, converts the data into a digital signal, and detects information contained in the 2-dimensional code included in the 2-dimensional image. The 2-dimensional image taken into the reader through the CCD sensor 11 includes information other than that contained in the 2-dimensional code. As explained above with reference to FIGS. 4A–4D, it is important to control the gain of amplifier based on brightness of the 2-dimensional code itself, not on a whole image data taken in by the CCD sensor 11. In case of a video camera, the gain is properly controlled based on brightness of a whole image by feeding the gain control voltage, which is a product of the difference voltage ΔV and a predetermined gain, to the AGC amplifier 12. However, in case of the 2-dimensional code reader, the gain of the AGC amplifier 12 has to be controlled based on the brightness of the 2-dimensional code itself to effectively and correctly detect information contained in the code. For this purpose, a region in which the 2-dimensional code exists (this region will be referred to as a code-region hereafter) in a whole image taken into the reader has to be identified. Then, the amplifier gain is controlled according to the brightness of the code-region.

Figure 2:
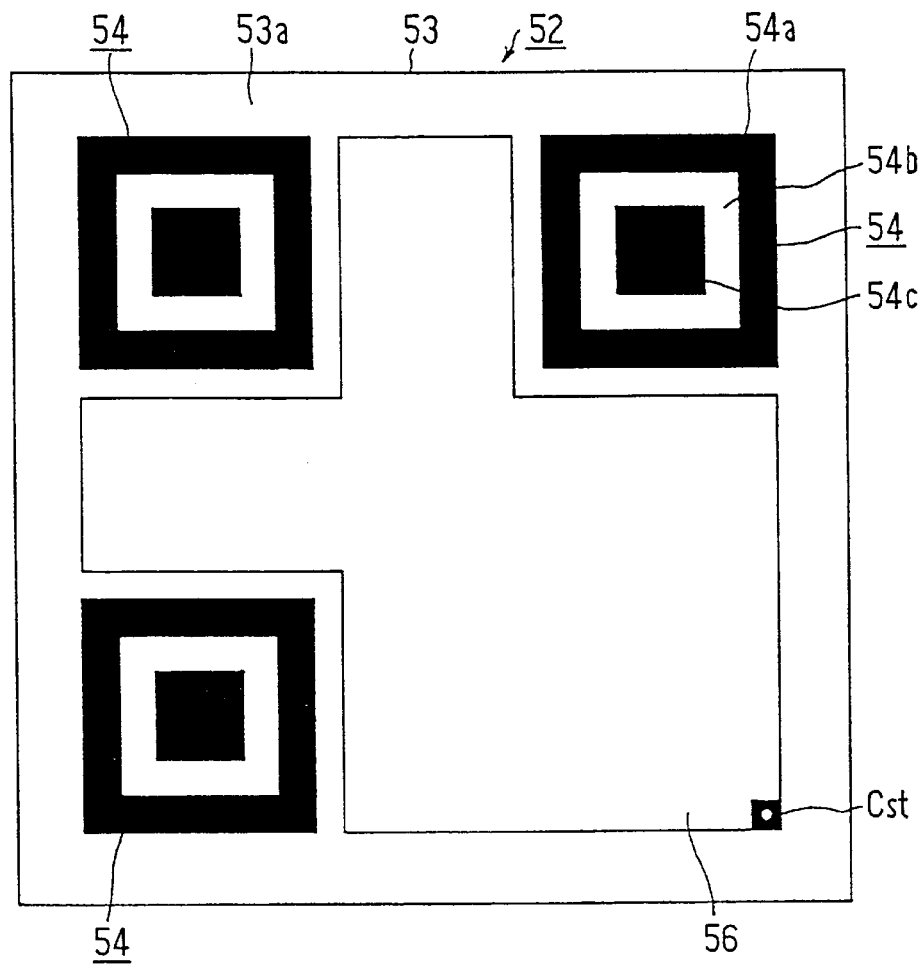
FIG. 2 is a plan view showing a 2-dimensional code which is suitable as a code to be read by the 2-dimensional code reader of the present invention.
Figure 3A:
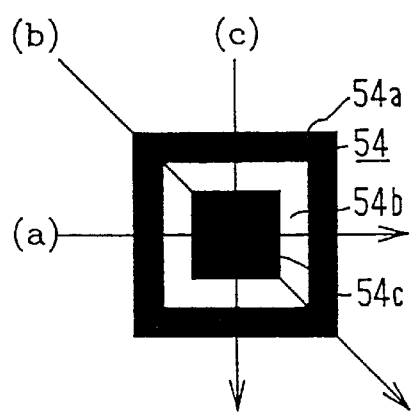
FIG. 3A is a drawing showing a symbol mark used in the 2-dimensional code shown in FIG. 2.
Figure 3B:
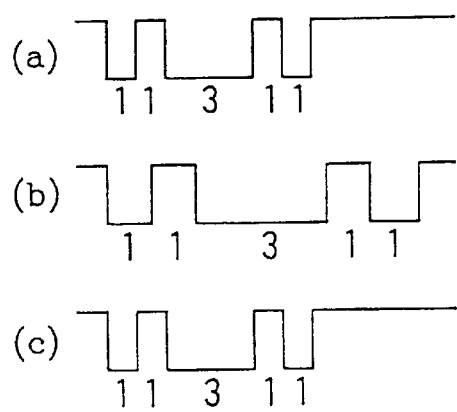
FIG. 3B is a chart showing waveforms obtained by scanning the symbol mark shown in FIG. 3A in directions (a), (b) and (c)
Figure 4A:
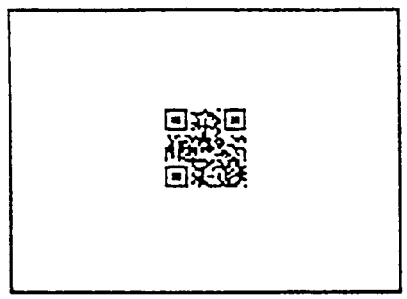
FIGS. 4A–4D are drawings showing brightness of whole images each including a 2-dimensional code therein.
Figure 4B:
Figure 4C:
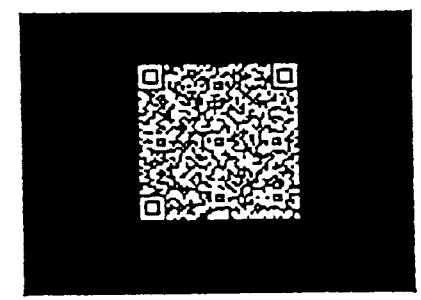
Figure 4D:
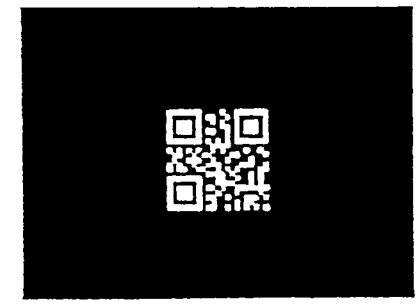

Referring to FIGS. 2, 3A and 3B, how the code-region is identified out of the whole image taken into the reader by the CCD sensor 11. A 2-dimensional code 52 shown in FIG. 2 is printed on a white paper 53. The 2-dimensional code 52 is composed of three symbol marks 54 positioned at three corners of the code for identifying the code-region, a data region 56 and an origin cell Cst which indicates an origin point of the code. The code includes 21×21 cells (21 cells in the row and 21 cells in the column) arranged in a square except the regions for the symbol marks. Each cell incudes a black and white pattern (not shown). Each symbol mark 54 is a black and white pattern including an outside black square frame 54a, an intermediate white square frame 54b and an inside black square 54c.

Signals obtained by scanning the symbol mark 54 in directions (a), (b) and (c) shown in FIG. 3A and by codifying into binary codes are shown in FIG. 3B. When the symbol mark 54 is scanned in the direction (a), the signal shown as (a) in FIG. 3B is obtained. Namely, a ratio of signal widths corresponding to the black and white pattern is 1(back):1(white):3(black):1(white):1(black), because a black and white ratio of the symbol mark 54 along the scanning line (a) is arranged to have this particular ratio. When the symbol mark 54 is scanned in the directions (b) and (c), signals (b) and (c) having the same ratio are obtained, respectively. This ratio is always obtained when the symbol mark 54 is scanned in any direction, because the pattern of the symbol mark 54 is a square having four sides of the same length.

The frequency analyzer 18 (FIG. 1) detects three symbol marks having this particular ratio, and thereby the code-region where the 2-dimensional code is located in the whole image taken into the reader is identified. More details of the process of identifying the code-region are disclosed in JP-A-8-180125.

Referring to FIG. 1 again, a process of changing the amplifying rate of the AGC amplifier 12 according to a signal level (brightness) of the identified code-region will be described below. The amplifying rate of the AGC amplifier 12 is changed by modifying the standard voltage Vst generated by the standard voltage generator 14. The standard voltage Vst is modified by a correction voltage α which is supplied from the camera controller 10 to the standard voltage generator 14. The correction voltage α is calculated based on an areal ratio of the code-region to a whole image region taken in by the CCD sensor 11 and an average signal level Vav of the whole image region. The areal ratio is readily calculated because the whole image region is predetermined and the code-region is identified in the manner described above. The average signal level Vav of the whole image region is calculated from the digital output of the A-D converter 19 temporarily stored in the image memory 20. Thus, the gain of the AGC amplifier 12 which is automatically controlled according to the average signal level Vav of the whole image can be properly modified by the correction voltage α. Therefore, the 2-dimensional code reader according to the present invention can properly read various 2-dimensional codes such as those shown in FIGS. 4A–4D.

Though the correction voltage α is obtained by calculation in the embodiment described above, it may be obtained by other ways. For example, the correction voltage α may be read out from a pre-stored map showing values of α corresponding to respective areal ratios and average voltages Aav. The correction voltage α is added to the standard voltage Vst to change the amplifying rate in the embodiment described above. The amplifying rate may be further modified in a following manner. It is judged whether or not the signal level of the code-region is within a predetermined control range after the amplifying rate is changed by using the correction voltage α. If the signal level is out of the range, the amplifying rate is further modified by adding another correction voltage β to the standard voltage Vst, so that the signal level falls within the control range. In other words, Vst is further modified by β in addition to α. Whether the code-region signal level is within the control level is judged based on the output signal from the A-D converter 19. It may also be judged based on an amplitude of the scanning signal before converting it to a digital signal or based on a signal level corresponding to a white pattern of the 2-dimensional code.

As shown in FIG. 1, the camera controller 10 using a 32-bit RISC CPU and the system controller 30 using a 16-bit CPU are separated, and each controller performs separate functions though both controllers are connected to each other. This is because the camera controller 10 performs functions, such as reading the 2-dimensional code and processing the data, which require a high speed, while the system controller 30 performs functions which can be carried out at a relatively low speed. If the system is designed for one controller to perform all the functions, a CPU having a high performance has to be used. By using two separate controllers as in the present embodiment, electric current consumption as a whole can be less, and the reader can be made smaller in size.

Figure 5:
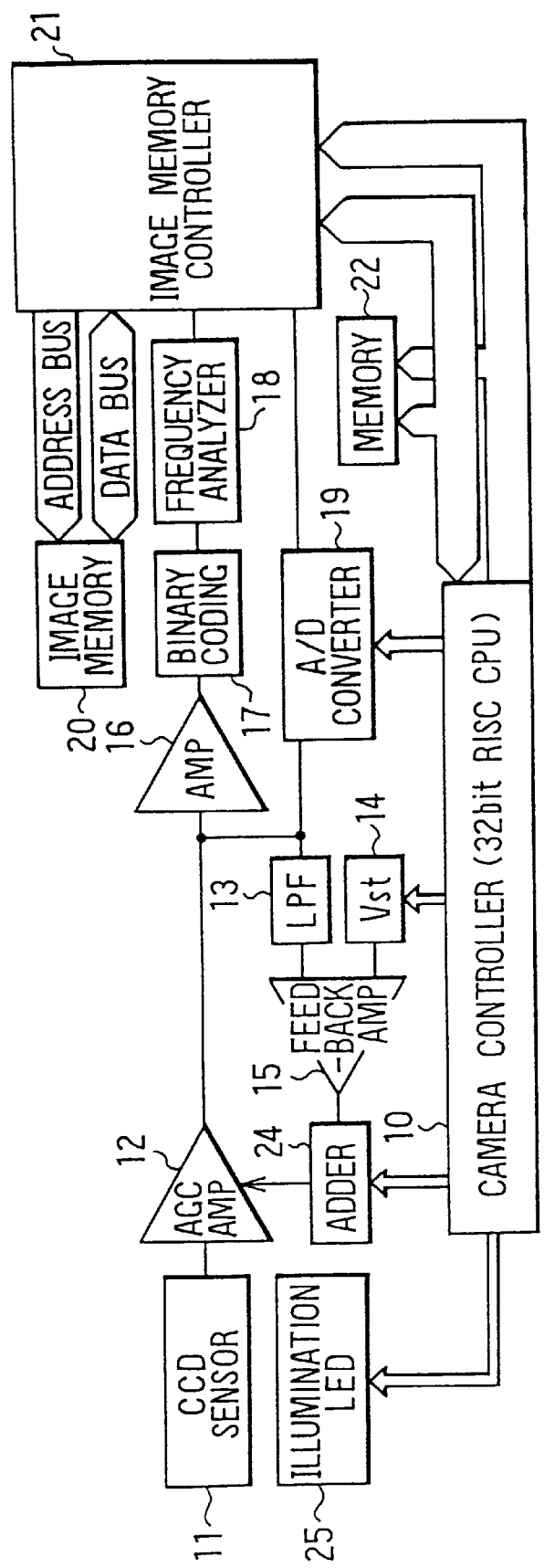
FIG. 5 is a block diagram showing a 2-dimensional code reader as a second embodiment of the present invention.

Referring to FIG. 5, a second embodiment of the present invention will be described. In FIG. 5, only a portion of the reader relating to the camera controller 10 is shown, because the other portion relating to the system controller 30 is the same as that of the first embodiment shown in FIG. 1. In the second embodiment, an adder 24 which is controlled by the camera controller 10 is connected between the feedback amplifier 15 and the AGC amplifier 12. The standard voltage generator Vst is not controlled by the camera controller 10, instead, it supplies a constant voltage to the feedback amplifier 15. Other structures and operations are the same as those of the first embodiment. The amplifying rate of the AGC amplifier 12 is basically controlled based on the difference voltage ΔV as in the first embodiment and modified by a voltage supplied from the adder 24. The voltage of the adder 24 is determined by the areal ratio of the code-region to the whole image region and the average signal level Vav of the whole image. The amplifying rate of the AGC amplifier 12 in the second embodiment is controlled to properly read the 2-dimensional codes under various situations in the same manner as in the first embodiment.

The embodiments described above may be modified in various forms. For example, the code-region may be identified by processing image data without using the symbol marks 54 shown in FIG. 2. In this case, whole image data constituting one frame are memorized in the image memory 20 after converting them into digital signals by A-D converter 19, and those memorized data are scanned by the camera controller 10 in a predetermined direction to find out signal patterns which are characteristic of the 2-dimensional code. In this manner, the code-region in a whole image region is identified. When the code-region is identified in this manner, the auxiliary amplifier 16, the binary coding circuit 17 and the frequency analyzer 18 can be eliminated from the reader shown in FIG. 1.

In order to detect information contained in the 2-dimensional code more accurately and correctly under any condition, illumination for an object carrying the 2-dimensional code may be required to be properly controlled in addition to controlling the amplifying rate. For this purpose, an intensity of the illumination and/or an illuminating period by the illumination LED 25 are controlled at a time when the amplifying rate of the AGC amplifier 12 is changed or modified. This is particularly effective when the change of the amplifying rate alone does not sufficiently cope with some difficult situations where the 2-dimensional code is placed.

The pattern of the symbol mark 54 shown in FIG. 2 may be modified in various forms. For example, it may be a hexagon or other polygons, as long as the signal width ratio corresponding to the pattern of the symbol mark is the same when it is scanned in any directions passing through the center of the mark. The symbol mark may be constituted by overlapping as many patterns as desired. Though the 2-dimensional code 52 shown in FIG. 2 is a square, it may be rectangular-shaped. Though three symbol marks are used in the embodiment described above, it is possible to use only two symbol marks. It is, of course, possible to use four symbol marks positioned at every corner. Moreover, the position of the symbol marks in the code is not limited to the corners of the code, but it may be arbitrarily selected.

A picture element of the liquid crystal display 33 can display the 2-dimensional code thereon with its two-step display (e.g., bright and dark). However, if it is required to display a 2-dimensional code which includes a picture image, the two-step display is not able to cover the picture image. In this case, one cell of the liquid crystal display corresponding to one datum may be constituted by four picture elements as shown in FIGS. 6A–6E. In this arrangement, a five-step display is possible. That is, when all four picture elements in a cell are bright as shown in FIG.

Figure 6A:
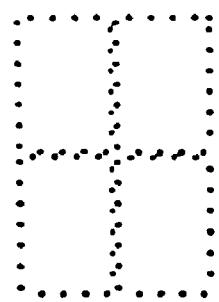
FIGS. 6A–6E are drawings showing a way of displaying a five-step image in a picture element in a liquid crystal display panel.
Figure 6B:
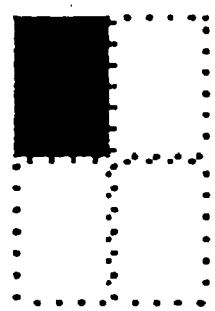
Figure 6C:
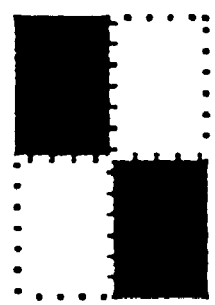
Figure 6D:
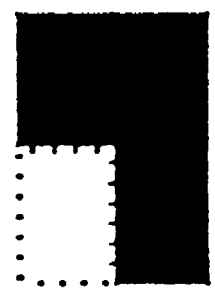
Figure 6E:

6A, the cell represents a first step. When one picture element is dark and the others are bright as shown in FIG. 6B, the cell represents a second step. When two picture elements are dark and the other two are bright as shown in FIG. 6C, the cell represents a third step. In the similar manner, FIGS. 6D and 6E show a fourth step and a fifth step, respectively. If each cell corresponding to one datum is arranged to include two picture elements, then a three-step display is possible in the same manner.

While the present invention has been shown and described with reference to the foregoing preferred embodiments, it will be apparent to those skilled in the art that changes in form and detail may be made therein without departing from the scope of the invention as defined in the appended claims.

What is claimed is:

1. A 2-dimensional code reader comprising:
   means for sensing an image including a 2-dimensional code therein by scanning the image;
   means for amplifying signals fed from the sensing means;
   means for identifying a code-region where the 2-dimensional code exists in the image, said code region being defined by symbol marks; and
   means for setting an amplifying rate of the amplifying means so that a signal level of the code-region falls within a predetermined control range.

2. The 2-dimensional code reader as in claim 1, wherein:
   the amplifying rate setting means includes means for judging whether the signal level of the code-region is in the predetermined control range and means for modifying the amplifying rate if the signal level of the code-region is out of the predetermined control range, so that the signal level of the code-region falls within the predetermined control range.

3. The 2-dimensional code reader as in claim 1, wherein:
   the amplifying rate setting means includes means for judging whether an amplitude representing the signal of the code-region is in a predetermined range and means for modifying the amplifying rate if the amplitude is out of the predetermined range, so that the amplitude falls within the predetermined range.

4. The 2-dimensional code reader as in claim 1, wherein:
   the amplifying rate setting means includes means for judging whether a signal level representing a relatively bright portion in the code-region is in the predetermined control range and means for modifying the amplifying rate if the signal level is out of the predetermined control range, so that the signal level falls within the predetermined control range.

5. The 2-dimensional code reader as in claim 1, wherein:
   the amplifying means includes an automatic gain controller which controls the amplifying rate of the amplifying means based on a difference between an average signal level representing a whole image fed from the sensing means and a standard level; and
   the amplifying rate setting means changes the amplifying rate by changing the standard level.

6. The 2-dimensional code reader as in claim 1, wherein:
   the amplifying means includes an automatic gain controller which controls the amplifying rate of the amplifying means based on a difference between an average signal level representing a whole image fed from the sensing means and a standard level, the difference being modified by adding an additional voltage; and
   the amplifying rate setting means changes the amplifying rate by changing the additional voltage.

7. The 2-dimensional code reader as in claim 5, wherein:
   the standard level is changed based on an areal ratio of the code-region to a whole image region and an average signal level representing the whole image.

8. The 2-dimensional code reader as in claim 6, wherein:
   the additional voltage is changed based on an areal ratio of the code-region to a whole image region and an average signal level representing the whole image.

9. The 2-dimensional code reader as in claim 1, wherein:
   the code-region identifying mean s includes a signal level detecting means which detects signal levels amplified by the amplifying means, the signal levels representing both a whole image fed from the sensing means and an image of the 2-dimensional code included in the whole image; and
   the code-region is identified based on the signal levels detected by the signal level detecting means.

10. A 2-dimensional code reader comprising:
    means for sensing an image including a 2-dimensional code therein by scanning the image;
    means for amplifying signals fed from the sensing means;
    means for identifying a code-region where the 2-dimensional code exists in the image; and
    means for setting an amplifying rate of the amplifying means so that a signal level of the code-region falls within a predetermined control range, wherein:
    the 2-dimensional code includes a symbol mark having a pattern to generate a specific signal pattern when it is optically scanned along lines passing through a center of the symbol mark, the symbol mark being placed at a predetermined position in the 2-dimensional code; and
    the code-region identifying means identifies the code-region in a whole image region by detecting the specific signal pattern.

11. The 2-dimensional code reader as in claim 10, wherein:
    the symbol mark is placed at at least two predetermined positions in the 2-dimensional code.

12. The 2-dimensional code reader as in claim 1, further comprising a device for illuminating a surface of the 2-dimensional code to be read, wherein:
    a light intensity of the illuminating device is adjusted when the amplifying rate is newly set, so that the 2-dimensional code is properly read under the newly set amplifying rate.

13. The 2-dimensional code reader as in claim 1, further comprising a device for illuminating a surface of the 2-dimensional code to be read, wherein:
    a period of time during which the 2-dimensional code is illuminated is adjusted when the amplifying rate is newly set, so that the 2-dimensional code is properly read under the newly set amplifying rate.

14. A method of reading a 2-dimensional code, comprising steps of:
    scanning a surface which includes a 2-dimensional code thereon to obtain electric signals from the scanned surface;
    amplifying the electric signals;
    identifying a code-region where the 2-dimensional code is located on the scanned surface, said code region being defined by symbol marks; and
    adjusting an amplifying rate so that a signal level from the identified code-region falls within a predetermined range.

15. The method of reading a 2-dimensional code as in claim 14, wherein:

the amplifying step includes a step of automatically controlling an amplifying rate based on a difference between an amplified average signal level corresponding to the scanned surface and a standard level; and the amplifying rate adjusting step includes a step of changing the standard level based on an areal ratio of the code-region to the scanned surface.

16. The method of reading a 2-dimensional code as in claim 14, the amplifying step includes a step of automatically controlling an amplifying rate based on a difference between an amplified average signal level corresponding to the scanned surface and a standard level; and the amplifying rate adjusting step includes a step of modifying the amplifying rate by adding an additional voltage to the difference, the additional voltage being determined based on an areal ratio of the code-region to the scanned surface.

* * * * *